(12) United States Patent
Kanof

(10) Patent No.: US 8,508,333 B2
(45) Date of Patent: Aug. 13, 2013

(54) AUTOMATIC PARKING STATION SYSTEM FOR CYCLES AND BICYCLES

(76) Inventor: Pedro Roberto Kanof, Washington, DC (US)

( * ) Notice: Subject to any disclaimer, the term of this patent is extended or adjusted under 35 U.S.C. 154(b) by 624 days.

(21) Appl. No.: 12/734,924

(22) PCT Filed: Dec. 12, 2008

(86) PCT No.: PCT/EP2008/067439
§ 371 (c)(1),
(2), (4) Date: Jun. 3, 2010

(87) PCT Pub. No.: WO2009/080566
PCT Pub. Date: Jul. 2, 2009

(65) Prior Publication Data
US 2010/0245128 A1    Sep. 30, 2010

Related U.S. Application Data

(60) Provisional application No. 61/008,568, filed on Dec. 21, 2007.

(51) Int. Cl.
| | |
|---|---|
| G05B 19/00 | (2006.01) |
| G08G 1/14 | (2006.01) |
| H04Q 5/22 | (2006.01) |
| G05D 1/00 | (2006.01) |
| G06F 19/00 | (2011.01) |
| B62H 5/00 | (2006.01) |

(52) U.S. Cl.
USPC ........... 340/5.6; 340/10.1; 340/432; 340/543; 340/568.1; 701/2; 701/1; 701/31.4; 235/381; 235/382; 70/233; 70/57

(58) Field of Classification Search
USPC .......................................................... 340/5.6
See application file for complete search history.

(56) References Cited

U.S. PATENT DOCUMENTS

| | | | | |
|---|---|---|---|---|
| 5,278,538 | A * | 1/1994 | Ainsworth et al. | 340/427 |
| 5,841,351 | A * | 11/1998 | Rey | 340/432 |
| 5,917,407 | A * | 6/1999 | Squire et al. | 340/432 |
| 6,384,717 | B1 * | 5/2002 | DeVolpi | 340/432 |
| 7,558,564 | B2 * | 7/2009 | Wesby | 455/419 |
| 7,726,160 | B2 * | 6/2010 | Gagosz et al. | 70/233 |
| 7,729,822 | B2 * | 6/2010 | Le Gars et al. | 701/33.4 |
| 7,898,439 | B2 * | 3/2011 | Bettez et al. | 340/999 |
| 2007/0220933 | A1 | 9/2007 | Gagosz et al. | |
| 2007/0239465 | A1 | 10/2007 | Le Gars | |

FOREIGN PATENT DOCUMENTS

| | | |
|---|---|---|
| DE | 44 07 804 A1 | 10/1994 |
| DE | 103 01 887 A1 | 7/2004 |
| EP | 0 875 867 A1 | 11/1998 |
| WO | WO 01/54080 A1 | 7/2001 |
| WO | WO 2006/120328 A | 11/2006 |

\* cited by examiner

*Primary Examiner* — Jennifer Mehmood
*Assistant Examiner* — Fekadeselassie Girma

(57) ABSTRACT

The invention refers to automatic parking station for cycles or bicycles, comprising at least one interactive workstation (2) and a plurality of parking posts (3). Each parking post includes a first lock portion (4) aimed at securing a cycle or bicycle thereto through a removable second lock portion (7) of the cycle or bicycle (6). The parking posts (3) are connected to the interactive workstation (2) through a local communication network (5) to allow exchange of commands between the interactive workstation (2) and the parking posts (3). Each parking post (3) comprises code reading means for reading a cycle/bicycle code univocally identifying a cycle or bicycle and stored in a memory medium, so that the cycle/bicycle can be identified by the interactive workstation (2).

5 Claims, 8 Drawing Sheets

AUTOMATIC PARKING STATION SYSTEM FOR CYCLES AND BICYCLES

The disclosures in U.S. Provisional Patent Application No. 61/008,568 filed Dec. 21, 2007, from which this application claims priority, are incorporated herein by reference.

FIELD OF THE INVENTION

The invention relates to an automatic parking station system for cycles and bicycles, in which parking stations are installed in a plurality of sites within a city or a limited geographical area and are connected via a centralized information system. The cycles and bicycles may be manual, electric, electrically-assisted or gasoline-powered.

BACKGROUND OF THE INVENTION

Statistics show that in many countries the fleet of cycles and bicycles owned by individual persons are relevant figures. To give some examples, in Italy and France the number of cycles and bicycles that are property of individual citizens amounts to more than 20 million in each country, meaning that there is one cycle or bicycle per 3.5 persons. Similar situations can be found, with some variations, in other countries such as Spain, United Kingdom, Germany, and the United States. In the Netherlands, there is more than one cycle or bicycle per person. This immense fleet of privately-owned cycles and bicycles cannot be ignored when an automatic parking station is built for cycles and bicycles.

Automatic parking stations for cycles and bicycles installed in diverse sites within a city and connected via a centralized information system are generally known. For instance, US 2007/0220933 and US 2007/0239465 disclose apparatuses for automatically renting cycles and bicycles.

The above prior art apparatuses suffer from some drawbacks, among which the most relevant one includes the fact that they are closed systems which are not suitable to serve a plurality of different users and operators.

SUMMARY OF THE INVENTION

Aim of the present invention is to solve the above drawbacks, by providing a system which allows to allow a plurality of different users of cycles/bicycles to benefit of automatic parking stations as opposed to the prior art apparatuses.

Within the above aim, an object of the present invention is to allow individual persons owning personal cycles/bicycles to use automatic parking stations, preferably together with other persons who wish to rent a cycle/bicycle.

A further object of the invention is to simplify use of the automatic parking stations, with particular regard to situations of overcrowding or lack of cycles/bicycles in the stations.

Another object of the invention is to allow the automatic parking stations to be used by different renting companies.

Yet another object of the invention is to allow renting companies to access updated data relating to their cycles/bicycles for billing, strategic and other business purposes.

The above aim and objects and other objects which will become better apparent hereinafter are achieved by an automatic parking station for cycles or bicycles, comprising at least one interactive workstation and a plurality of parking posts, each parking post including a first lock portion aimed at securing a cycle or bicycle thereto through a removable second lock portion of the cycle or bicycle, the parking posts being connected to the at least one interactive workstation through a local communication network to allow exchange of commands between the at least one interactive workstation and the parking posts, characterized in that each parking post comprises code reading means for reading a cycle/bicycle code univocally identifying a cycle or bicycle and stored in a memory medium, so that the cycle/bicycle can be identified by the interactive workstation.

The above aim and objects are also achieved by an automatic parking station system comprising a plurality of the above automatic parking stations and a central server connected to the plurality of automatic parking stations via a station communication network, the automatic parking stations being client nodes of the network, being located in different sites of a city or a geographical area and being associated to a respective parking station code used for addressing in the station communication network.

The aim and the objects of the invention are also achieved by a method for allowing use of cycle/bicycle parking stations to both private users and renting companies owning cycles or bicycles, comprising the steps of:

issuing a unique cycle/bicycle code;

storing owner identification data associated with the cycle/bicycle code;

fixing a memory medium in which the cycle/bicycle code is stored to a second lock portion of a locking mechanism;

fixing the second lock portion to a cycle or bicycle of a owner, the owner being either a private user or a renting company;

providing the above automatic parking station system.

BRIEF DESCRIPTION OF THE DRAWINGS

Further characteristics and advantages of the invention will become better apparent from the following description of preferred but not exclusive embodiments, illustrated by way of non-limiting examples in the accompanying drawings, wherein.

DESCRIPTION OF PREFERRED EMBODIMENTS

Figure 1:
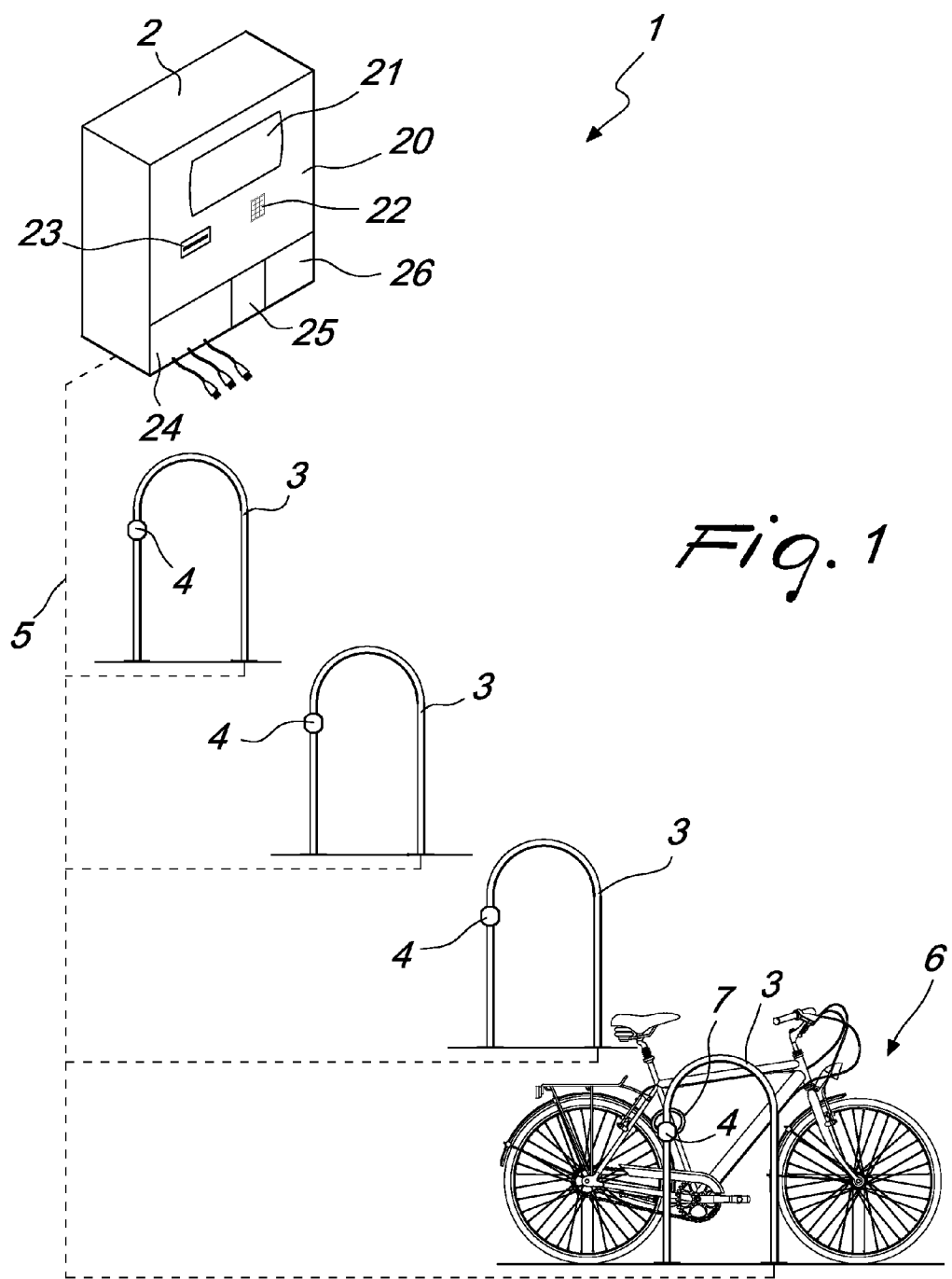
FIG. 1 shows an automatic parking station according to a preferred embodiment of the invention.

With reference to FIG. 1, a cycle or bicycle automatic parking station 1 according to a preferred embodiment of the invention comprises at least one interactive workstation 2 and a plurality of parking posts 3, each including a first lock portion 4, which is permanently fixed to or is integral part of the respective parking post 3.

Each parking post 3 may be a bow or an iron U-shaped rod of at least 1 inch diameter which is fixed to the ground and is aimed at securing cycles or bicycles thereto through a second lock portion 7 fixed to the cycles or bicycles, which is complementary to the first lock portion 4. The first lock portion 4 may be welded to a vertical part of the U-shaped rod at a height which is suitable for locking both adult and child cycles/bicycles, e.g. between 55 cm and 60 cm from the ground or the rod's support surface. The second lock portion 7 is fixed to the cycle/bicycle frame, e.g. underneath the seat, at a height corresponding to the height of the first lock portion 4 with respect to the ground or the floor, so that the two lock portions face each other when the cycle/bicycle is approached to the parking post 3 and can be connected to each other.

Figure 4:
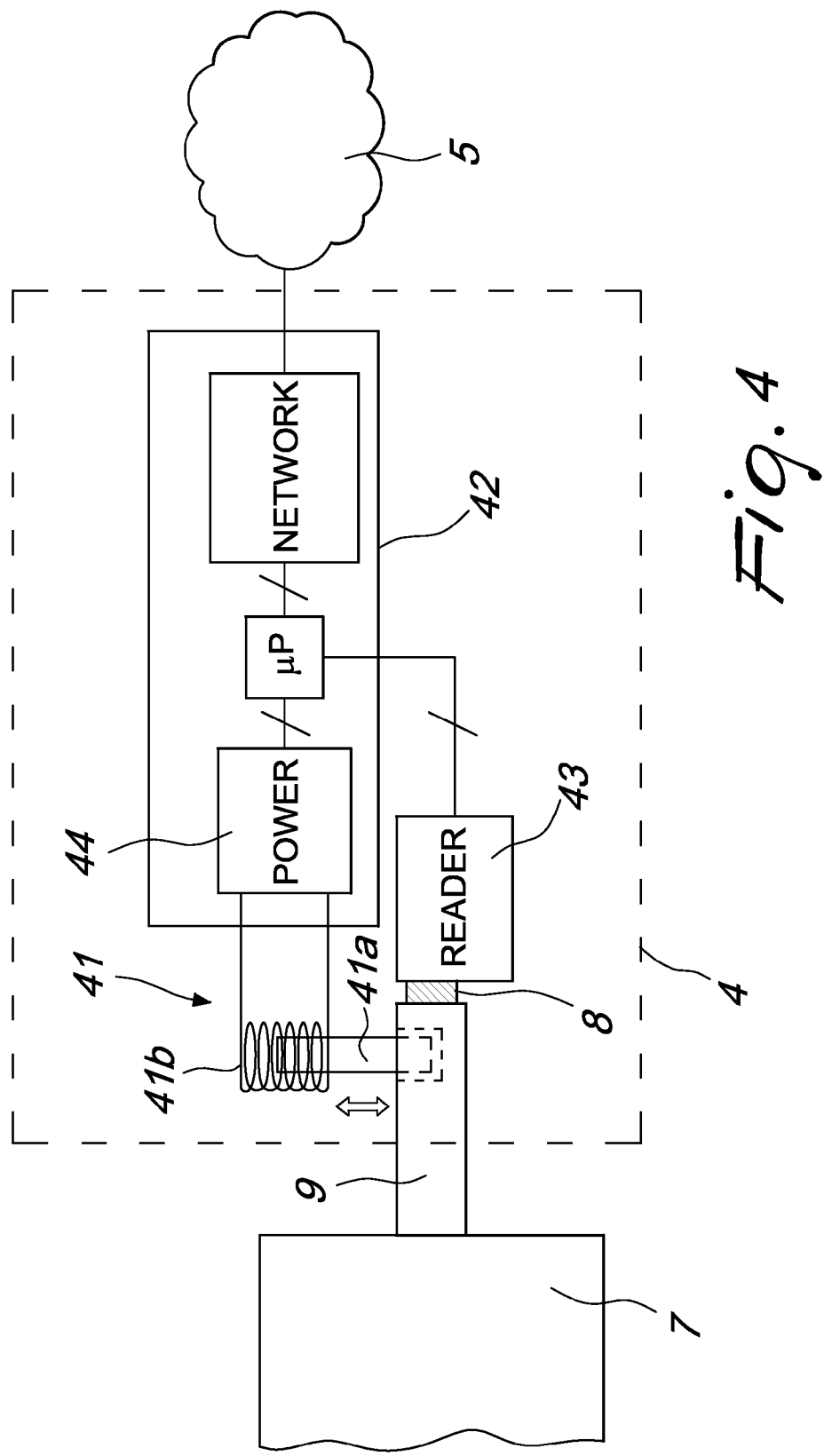
FIG. 4 is a schematic view of a mechanism for locking a bicycle or cycle to the individual parking post of an automatic parking station according to an embodiment of the invention.

With reference to FIG. 4, each first lock portion 4 may comprise an electromagnetic lock 41 and a microprocessor circuit 42 able to activate the electromagnetic lock 41 from a locking position to an unlocking position and vice versa.

The microprocessor circuits 42 of the first lock portions 4 are all connected to the interactive workstation 2 through a local communication network 5, preferably a cable network, in order to allow exchange of messages and commands between the interactive workstation 2 and the parking posts 3.

In order to allow network communication, the microprocessor circuit 42 of each parking post 3 contains a unique post identification number stored therein, for univocally identifying each parking post 3. Such code preferably comprises a parking post code, for univocally identifying the parking post 3 among the plurality of parking posts included in the automatic parking station 1. An automatic parking station code may also be included in the post identification number, for univocally identifying each parking post code in a network of automatic parking stations, which will be described hereinafter.

Moreover, each first lock portion 4 comprises reading means 43 preferably connected to the microprocessor circuit 42 and able to read a cycle/bicycle code univocally identifying a cycle or bicycle 6. The cycle/bicycle code is stored in a memory medium 8 of the second lock portion 7 fixed to the frame of the cycle or bicycle 6. The memory medium 8 may be of either permanent or rewritable kind.

The reading means 43 may be an electrical contact reader, which is per se known in the art, and the memory medium 8 may be an integrated circuit such as a smart card or IC chip, which is applied to a surface of the second lock portion 7 so that the code can be electrically read by the electrical contact reader when the second lock portion 7 is joined to one of the first lock portions 4 and the chip accordingly contacts the electrical contact reader.

As an alternative, the reading means 43 may be an electromagnetic reader, which is per se known in the art, and the memory medium 8 may be a magnetic strip or chip applied to a surface of the second lock portion 7 so that the code stored therein can be read by the magnetic reader when the second lock portion 7 is joined to one of the first lock portions 4 and the magnetic strip or chip where the code is stored contacts the magnetic reader.

As a further alternative, the reading means 43 may comprise an optical reader, which is per se known in the art, and the memory medium 8 may be a bar code applied to a surface of the second lock portion 7 so that the bar code can be read by the optical reader when the second lock portion 7 is joined to one of the first lock portions 4 and the bar code accordingly approaches the optical reader.

In any of the above alternatives, the memory medium 8 may be applied to the front surface of a male part 9 of the second lock portion 7 and the code reading means 43 may be installed in the bottom of a corresponding female part of the first lock portion 4 so that the memory medium 8 contacts a reading surface of the reading means 43 when the male part 9 is inserted in the female part of the first lock portion 4.

As an alternative, the male part may belong to the first lock portion and the female part may belong to the second lock portion. In this case, the memory medium is fixed to the bottom of the female part and the reading means are mounted on the front surface of the male part.

Other shapes of the locking parts may be provided in the alternative, but in any case the memory medium shall be fixed to a position of the removable locking part which can be read by the reading means through contact or approach. For instance, the memory medium 8 may be attached to the front face of the second lock portion and the reading means may include their sensitive surface in flush with the front face of the first lock portion.

Red and green LEDs may be optionally provided in each of the first lock portions 4 and be connected to the microprocessor circuit 42 for clearly showing the locked/reserved or unlocked/free state to the user, respectively.

The code stored in the memory medium 8 may be chosen so as to univocally identify the cycle or bicycle to the interactive workstations 2 and to the automatic parking stations system in general, and also to discriminate between cycles/bicycles owned by single private users and cycles/bicycles owned by a renting company and between renting companies. For instance, code 357456rts may indicate that the bicycle no. 357456 is owned by a single private user, while code 67254erp would indicate "bicycle no. 67254 owned by renting company ERP".

The connection between the first and the second lock portions 4 and 7 allows the cycle or bicycle to be identified, registered and locked to the parking post 3.

To this aim, the microprocessor circuit 42 of each parking post 3 may be suitably programmed to activate the electromagnetic lock 41 (and the red LED, if any) upon full connection of the second lock portion 7 to the first lock portion 4, e.g. upon insertion of the male part 9 of the second lock portion 7 into the female part of the first lock portion 4 as depicted in FIG. 4, or upon contact of the memory medium 8 with the reader 43.

The electromagnetic lock 41 may include a metal cylinder 41a movable within a coil 41b to which electrical current can be supplied in both directions by a power circuit 44 of the microprocessor circuit 42. The current flowing in the coil 41b in a first direction will cause axial movement of the metal cylinder 41 a towards a corresponding recess in the male part 9 (locking position), while the current flowing in the opposite direction will cause axial movement of the metal cylinder 41a in the opposite direction (unlocking position).

Obviously, the person skilled in the art may find different alternatives to the above locking mechanism. For instance, instead of the cylinder 41a, the lock may be constituted by a metal hook pivoted to a fixed point of the first lock portion 4, so as to grip a recess in the male part 9 of the second lock portion 7, and the coil 41 b may be used to move such hook towards or away from such recess.

As another example, the locking components of the first and second lock elements may be both electro-magnetic and be so configured as to face or contact each other when the second lock element 7 is to be connected to the first lock portion 4. In this case, locking and unlocking may derive from a change of the magnetic polarity of the first lock portion 4 via the microprocessor circuit: an identical polarity of the reciprocally contacting parts of the two lock portions will cause unlocking of the same, while a different polarity will cause locking.

The first lock portion 4 may also include a smart card reader for allowing a user to pick up or drop off a cycle/bicycle directly at the parking post 3. If the cycle/bicycle is privately owned by the user, the smart card will serve as an access key. The smart card may be issued by the provider of the automatic parking stations system and be requested via the Internet or in suitable shops, both in case of cycles/bicycles for rent and of privately owned cycles/bicycles. Optionally, other cards different from smart cards could be used for the same purpose.

With reference to FIG. 1, an interactive workstation 2 according to a preferred embodiment of the invention comprises a computer 20 with a touch-screen display 21, and means for user identification such as a numerical keypad panel 22 with additional control keys and an opening 23 suitable to receive an electronic payment card (credit card, debit card or similar), a smart card or a discount card, to allow a client-system dialogue, e.g. for the access to cycles or bicycles which are privately-owned or available for rent or other services. The smart card or the discount card may be issued by the provider of the automatic parking stations system or by a renting company and may be requested via the Internet or in suitable shops.

The computer 20 is connected to all of the first lock portions 4 of the parking posts 3 via the cable network 5, which may be underground. Below and connected to computer 20 there may be an electric supply service box 24 permitting battery recharge of electric or electrically assisted cycles and bicycles and containing various plugs or sockets where at least one cycle or bicycle can be charged at any given time. Below and connected to computer 20 there may be a fuel service box 25 permitting the fueling of gasoline-powered cycles and bicycles. Below and connected to computer 20 there may be also a compressed air service box 26 permitting the tire inflation of cycles or bicycles.

Figure 2:
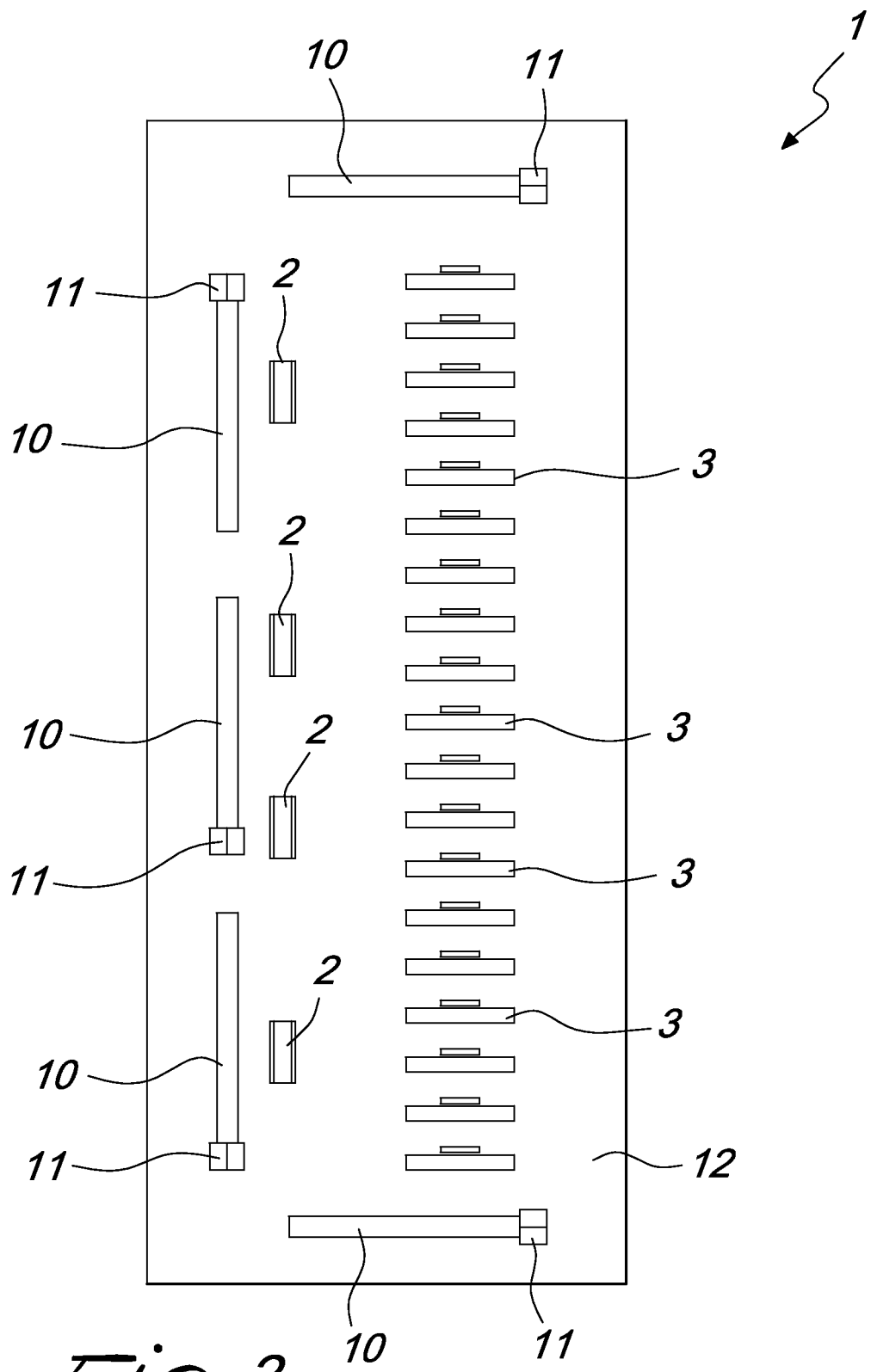
FIG. 2 is a top view of an automatic parking station according to the invention.

FIG. 2 shows a top view of a layout of an automatic parking station according to a preferred embodiment of the invention, which comprises a plurality of interactive workstations 2 all connected to the local network 5, for allowing the automatic parking station to serve multiple users at the same time. The station is covered by a roof 12 to provide shelter. Transparent walls 10, which can be made of glass or heavy-duty plastic, encircle the parking station and provide lateral shelter. Columns 11 are placed around the parking station to hold up roof 12 and the walls 10. Installed by walls 10 are the interactive workstations 2, as described above with reference to FIG. 1.

Each automatic parking station 1 may optionally include means for displaying advertisement such as paper, computer, video and TV displays. In case of computer-supported advertisement, the computer supporting such function may be configured to receive input messages to manage a sequence of adverts, each of them optionally having different frequency and duration. The kind of advertisement may depend on the location where the automatic parking station is placed. One or more displays may also be used for both advertisement and TV broadcasting.

Sensors such as infrared or ultrasonic sensors may be optionally placed at each parking post 3, in order to detect any forced removal of the parked cycle/bicycle or any other actions aimed at stealing components of the cycle/bicycle, and to signal such actions to a sounding alarm system, which may be also connected to a police station. The alarm system may comprise a timer, for signaling an alarm situation only when the above actions continue for more than a predetermined period of time.

The sensors may be so displaced as to be sensitive to movements occurring in a volume around the parking post 3 which is suitable to fully include one cycle/bicycle. The sensors or the protection systems activating the sensors may be automatically activated or deactivated via the interactive workstations 2.

In the preferred embodiments of the invention, the automatic parking stations 1 are strategically spread in various locations of a city or limited geographical area, for instance in public areas such as outside on sidewalks and/or inside commercial spaces especially dedicated to contain them.

Figure 3:
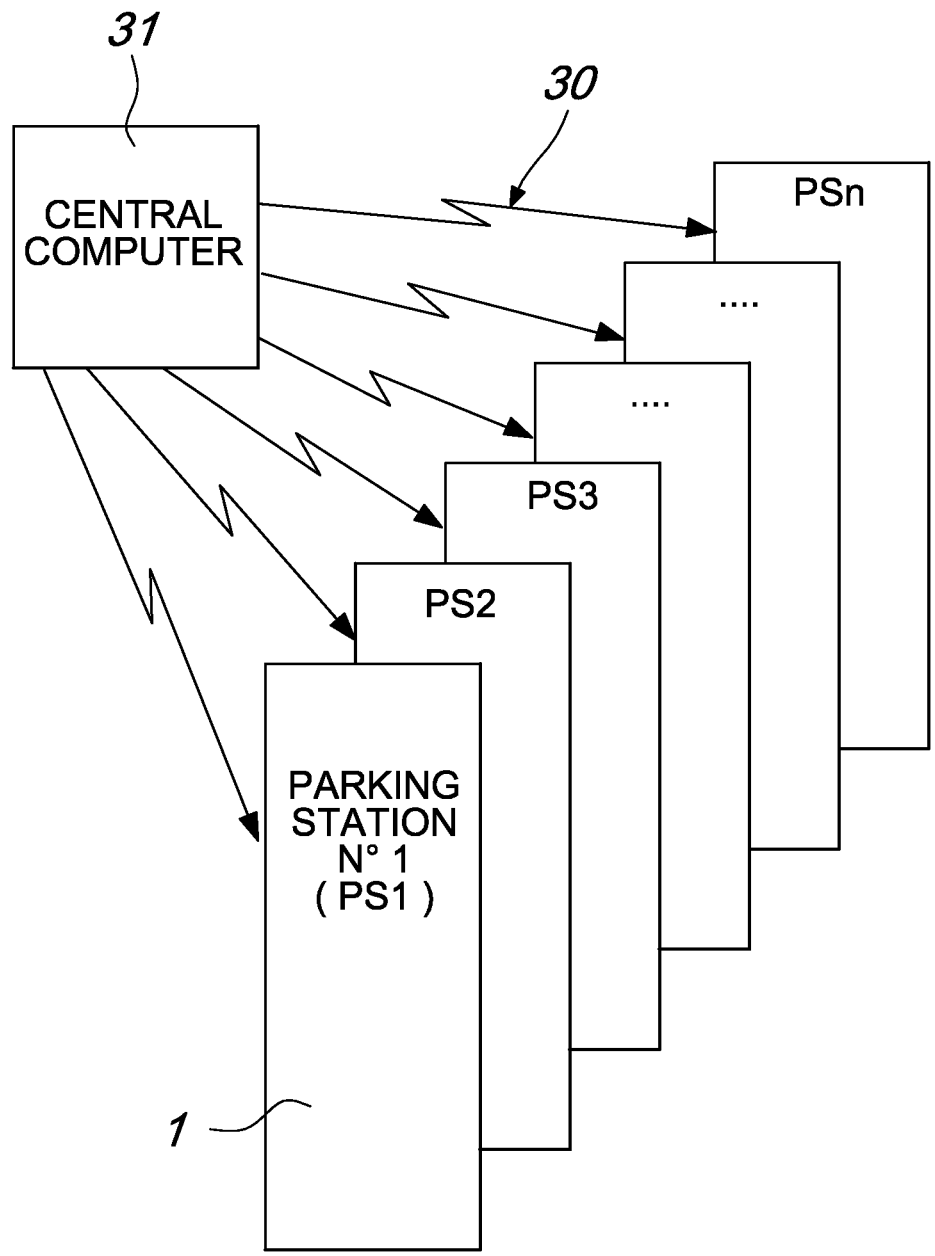
FIG. 3 is a network of automatic parking stations including a centralized information system for connecting several automatic parking stations located at different sites within a city or a limited geographical area.

The stations 1 are connected one to another via a station communication network 30 as shown in FIG. 3, which may be any one of wireless, radio, satellite or cable network. A wireless network is the most preferred one.

The automatic parking stations 1 are client nodes of such communication network 30 and are connected to a central server computer 31 preferably via a star connection. To this aim, each automatic parking station 1 is univocally identified in the network 30 by a respective parking station code PSx, which will be used in the messages exchanged between the interactive workstations 2 and the central server 31 for addressing purposes. Obviously, different connections such as tree or hierarchical connections may be provided as alternatives to the star connection.

The interactive workstations 2 inside the automatic parking stations 1 are suitably programmed to exchange messages with the central server 31. The messages from the automatic parking stations may include status messages comprising information about the busy/free parking status of the respective automatic parking station 1 that sends the status message, either upon request from the central server 31 or on a periodical basis. The messages may also include operational messages such as which user used which cycle/bicycle at which time, servicing/maintenance requests, as well as charging or billing messages from the central server 31, for requesting or acknowledging payment by a user. The messages may also include requests and corresponding responses for available free parking lots in the surroundings, as will be explained hereinafter.

The central server 31 is configured to receive the request, status and operational messages, e.g. a request for servicing or maintenance, from the interactive workstations 2 and update a database which will be used for providing parking status information upon request and other information for billing purposes. The database at the central server 31 may include a user database and a parking database.

The user database preferably contains at least user identification data, billing information and a cycle/bicycle code as defined above. The user database may also contain information on the time of a certain operation by the user, which means of payment he used, and which parking post he used for parking or left free.

This information may be used by the provider of the automatic parking stations system or made accessible to the various renting companies for billing and other commercial or strategic purposes.

For instance, it is important that each renting company is provided with real-time information on where its cycles/bicycles are parked, on which automatic parking stations have few or no residual cycles/bicycles of the renting company because of a large demand, on which automatic parking stations have many or all of the cycles/bicycles of the renting company unused because of a scarce demand, on which way of payment was predominantly used, or on how much money was collected at the end of the day, and so on.

The central server 31 may configured to allow the various renting companies to access the user database. In this case, the central server 31 preferably hides the names and other private data of the cycles/bicycles users to the renting companies.

The parking database preferably contains parking availability data based on availability information sent by the interactive workstations 2 of the various automatic parking stations 1 connected to the network 30. In this database such availability information is associated to the parking station code and to a geographical location (e.g., the street address) of the automatic parking station corresponding to such code and may also include the number of posts having a locked cycle/bicycle available for rent and/or the number of posts having no cycles/bicycles locked thereto. Such number is updated based on the status messages from the interactive workstations 2 sent either autonomously or upon a request by the central server 31.

The central server 31 may also be connected to or be configured to act as a billing system, performing the registration of the identification number of the parking station, the valid electronic payment number of the cycle/bicycle renter or private owner (such as a credit card number, debit card number, discount card number, smart card number, bank account number), the identification code of the cycle/bicycle, the date and time of either drop off or pick up of the cycle/bicycle, the current location of the cycles/bicycles of the renting companies and other information.

The billing system may also he configured to calculate the bill, based on the time for which the cycle/bicycle has been rented or the private cycle/bicycle has been parked, to prepare the bill, in printed or electronic form, and to send it to the appropriate electronic payment company, via mail or electronically, and to the renting companies.

In addition to the parking stations, the central server 31 may also be connected to the Internet or to a phone network, wired or mobile, such as PSTN, GSM, GPRS or UMTS networks, in order to be remotely accessible for renting or parking requests from any users subscribed to the service.

Figure 5:
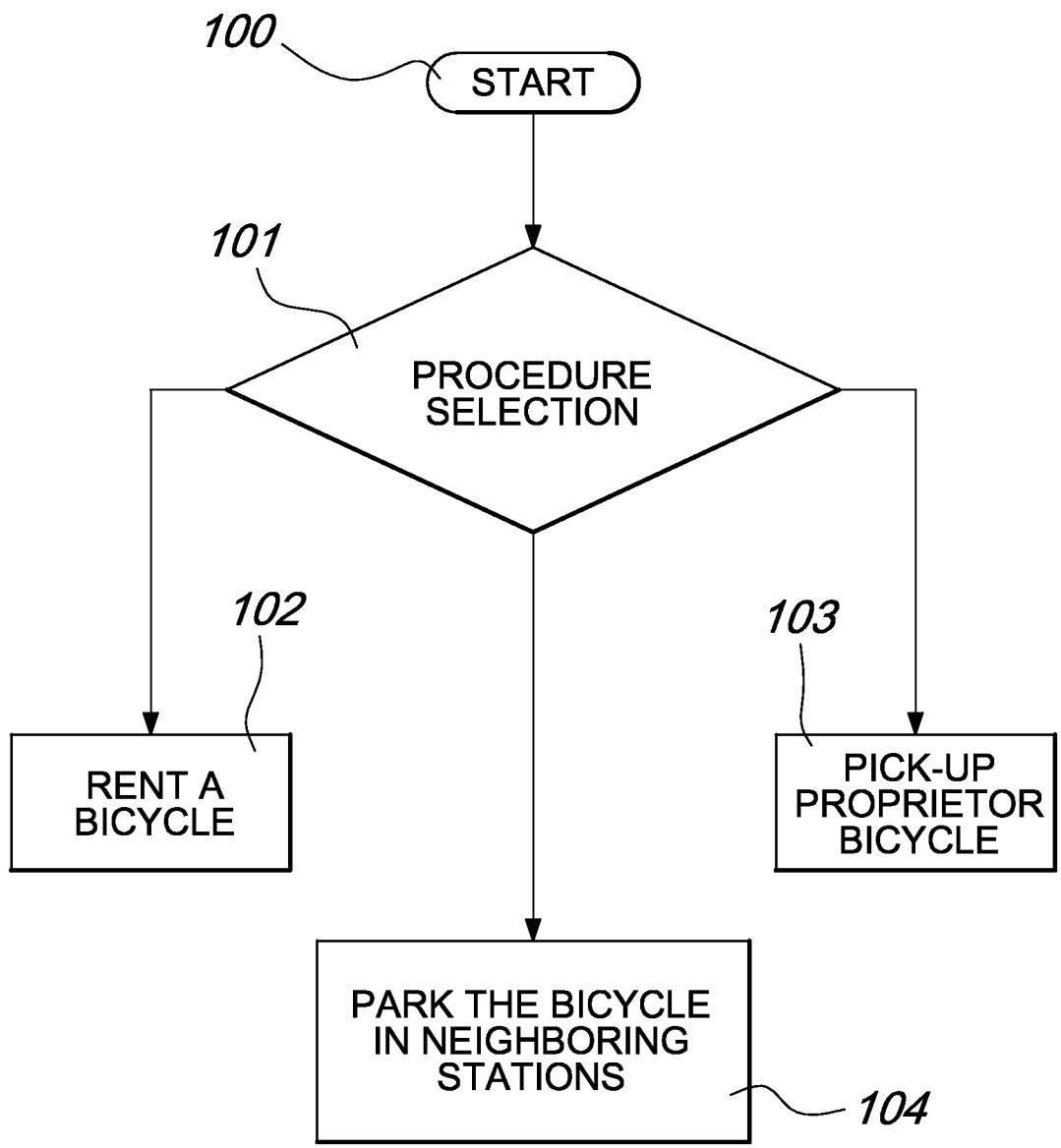
FIG. 5 is a flow diagram of the operation method of an automatic parking station according to the invention.

The operation of the preferred embodiment of the automatic parking station 1 is as follows. With reference to FIG. 5, upon turning on 100, the interactive workstation 2 presents an information screen to the user via the display 21, where three options are provided (step 101): the first option is taking a cycle/bicycle for rent, the second option is picking up the user's own cycle/bicycle and the third option is parking a cycle/bicycle when all of the parking posts 3 of the automatic parking station 1 are busy or booked.

Based on the selection by the user, the procedure continues in steps 102, 103 and 104, respectively.

Upon selection of the first option, the procedure 102 starts (step 121) and the interactive workstation 2 requests the user to insert his credit/debit card, his smart card or his discount card and, if necessary, to insert the corresponding PIN. The PIN may be associated to the discount card, which has been issued to the user by one of the renting companies sharing the automatic parking station service or by a provider of the private parking service.

In step 123 the card data and/or the PIN are validated by the interactive workstation 2, by sending the acquired information to the central server 31 which will check the user data (via the PIN, if already available) or will create a new entry for the user in its user database. The cycle/bicycle code will be preferably stored in the user's entry at the user database, for checking later whether the correct cycle/bicycle has been returned and for any other operation in which information about a specific cycle or bicycle is needed by either the provider of the automatic parking station system or by the renting company owning that cycle/bicycle.

If errors occur, such as an invalid PIN entry (step 124), the procedure loops back to step 122 and data is requested again to the user.

Once the PIN validation or the new user registration have been successfully performed, the central server 31 sends an OK message to the interactive workstation 2, which verifies whether a cycle/bicycle is available for rent in the automatic parking station 1 where the interactive workstation 2 is installed (step 125).

If there is a cycle/bicycle available for rent at the automatic parking station 1, the interactive workstation 2 displays the parking post number from where the rented cycle/bicycle can be picked up, updates the local table stored in the interactive workstation 2 in order to set the corresponding parking post 3 as free, sends a status message to the central server 31 for registering the cycle/bicycle code and, optionally, the time of the day when the rented cycle/bicycle has been picked up. Finally, the interactive workstation 2 addresses an unlock command to the microprocessor circuit 42 of that parking post 3 via network 5 (step 126).

Upon reception of the unlock command, the microprocessor circuit 42 of the first lock portion 4 supplies current to the electromagnet 41 so as to move the cylinder 41a or the hook to the unlocking position, or reverts the electromagnet polarity to the unlocking state, based on the specific implementation of the lock portions 4 and 7 discussed above.

The microprocessor circuit 42 may optionally send the interactive workstation 2 an unlocking confirmation message, via the network 5, and the interactive workstation may update its local table in order to set the corresponding parking post 3 as free only upon reception of such message.

A short time slot may be defined (e.g. 60 seconds) in which, if the second lock portion 7 is connected again to the first lock portion 4, the system assumes that the cycle/bicycle the user has just picked up is not in good conditions or have some working problems. If so, the picking up operation is canceled with no cost for the user and the user is allowed to pick up another cycle/bicycle. The interactive workstation 2 will accordingly label in its local table the just returned cycle/bicycle as not working or not available for rent and send an operational message to the central server 31 for requesting servicing and maintenance.

The free status of the post 3 from which the cycle/bicycle has been picked up is preferably notified to the central server 31 via a status message containing the automatic parking station code and, optionally, the parking post code. The status message may be the same message notified in step 126 or a new one, depending on whether it is desired to notify the status only when the automatic parking station is certain that unlocking occurred.

The central server 41 updates the user data entry in the users database with the date and the time of the day when the user has picked up the cycle/bicycle, which will be used to correctly charge the user when the rented cycle/bicycle is returned and/or to make information on the current status of the cycle/bicycle available upon request, e.g., by the renting company owning the cycle/bicycle. The date and time of the day may be automatically registered by the central server 31 or be received via the status message from the interactive workstation 2.

If no cycle/bicycle is available for rent at the automatic parking station 1, in step 127 the interactive workstation 2 sends the central server 31 a request message for available cycle/bicycles at neighboring automatic parking stations connected to the same central server 31.

Upon reception of this message, the central server 31 checks its parking database and sends the interactive workstation 2 a response message containing the geographical location(s) of the automatic parking station(s) in the surroundings of the automatic parking station 1 from which the request has arrived. The interactive workstation 2 accordingly displays the user the location(s) of the neighboring automatic parking station(s) where a cycle/bicycle is available for rent, optionally showing how such location(s) can be reached from the user's current position.

In step 128 the interactive workstation 2 waits for the user's selection. If the user withdraws his request, the procedure is closed in step 129. Otherwise, after selection by the user of one of the available stations (step 130), the interactive workstation 2 sends a booking message to the central server 31 which accordingly forwards the booking message containing the user's identification data to the interactive workstations of the selected automatic parking station. Such interactive workstations keep the corresponding parking post 3 locked and unavailable to other users for a certain time span, depending on the distance from the requesting automatic parking station 1, and sends a booking confirmation message to the central server 31, containing the parking post code and the cycle/bicycle code. Both the time span and the codes are forwarded to the requesting interactive workstation 2, which displays the same to the user (step 131).

Once the user has reached the automatic parking station where the booked cycle/bicycle is located, he simply identifies himself at one of the interactive workstations, which accordingly unlocks the cycle/bicycle and updates the central server 31 as in step 126.

Figure 8:
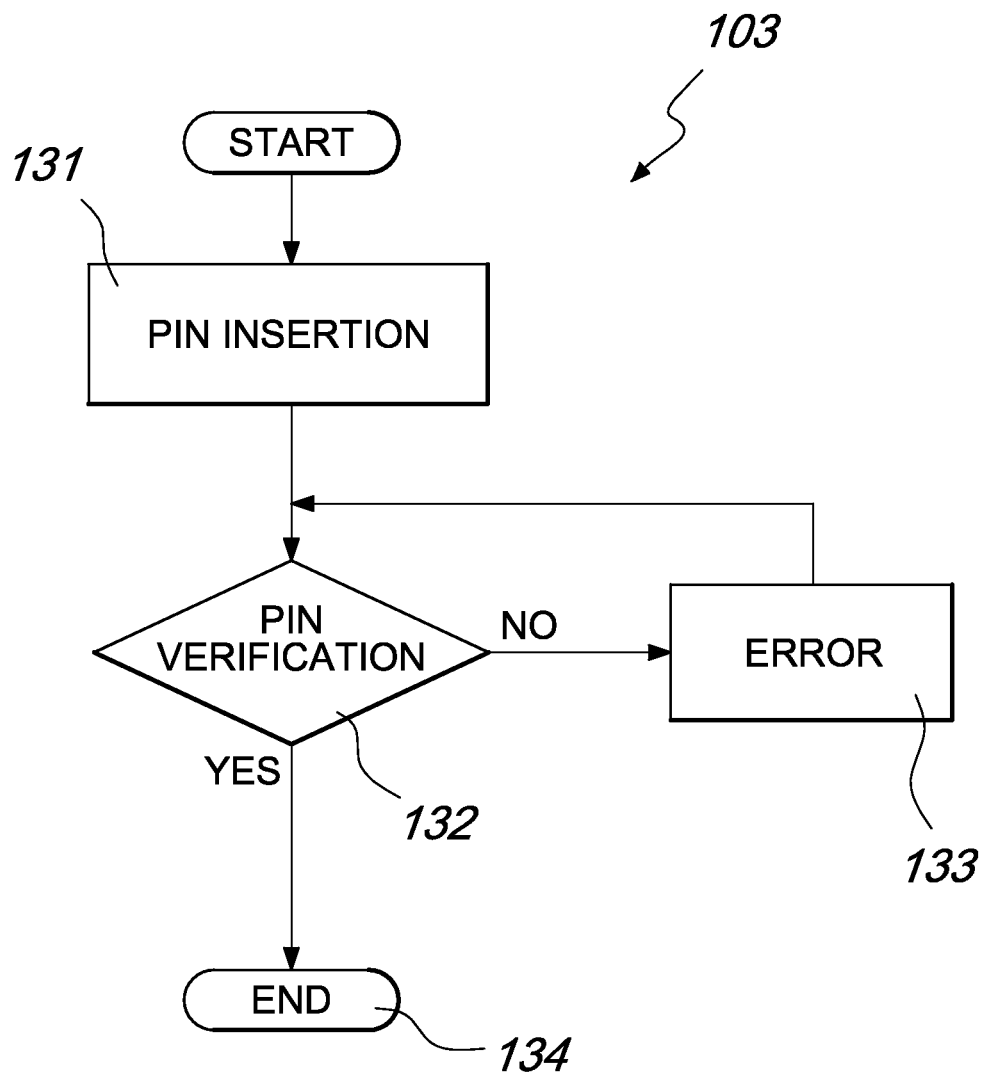
FIG. 8 is a flow diagram of the method of FIG. 5 when a private cycle/bicycle is to be picked up from the automatic parking station.

In procedure 103, shown in FIG. 8, the user can pick up his own cycle/bicycle from a parking post of any one of the automatic parking stations of the network 30.

The procedure is preceded by a user registration step, which may be performed at one of the providers which manage the automatic parking stations. These providers do not necessarily coincide with the companies offering the cycle/bicycle renting service.

The registration at the providers consists in creating a user entry in the user database at the central server 31, comprising the user's personal identification and billing information (such as a bank or credit card account, or other data on the kind of payment or subscription), a unique cycle/bicycle code and a unique PIN. At the provider, the user is given the PIN, to be used for identifying himself at any one of the interactive workstations 2, and a second lock portion 7 bearing a memory medium 8, which stores the unique cycle/bicycle code assigned to him. An operator of the provider's then mounts the second lock portion 7 to the frame of his own cycle/bicycle, preferably by welding or other permanent fixing means and at a height suitable for interaction with the first lock portions 4 of the system.

The user will be charged for the time during which his own cycle/bicycle resulted as parked at the users database in the central server 31 or will be charged with a flat rate.

When the user wishes to pick up his own cycle/bicycle parked in an automatic parking station 1, the interactive workstation requests the user to enter his PIN through the keypad 22 (step 131) and, if necessary, to insert the credit/debit/discount/smart card in the slot 23.

In step 132, the interactive workstation 2 sends a message comprising the PIN to the central server, which will check the user database, and waits for a confirmation. If no entry is found for that PIN, the interactive workstation receives a failure message in step 133 and request the user to insert his PIN again. Otherwise, if the PIN is correct, the central server updates the user database with the new status of the cycle/bicycle ("no longer parked") and sends a confirmation to the interactive workstation 2, which accordingly sends an unlock command to the post 3 where the user's own cycle/bicycle is parked. The green LED at the post 3 will be turned on.

Figure 6:
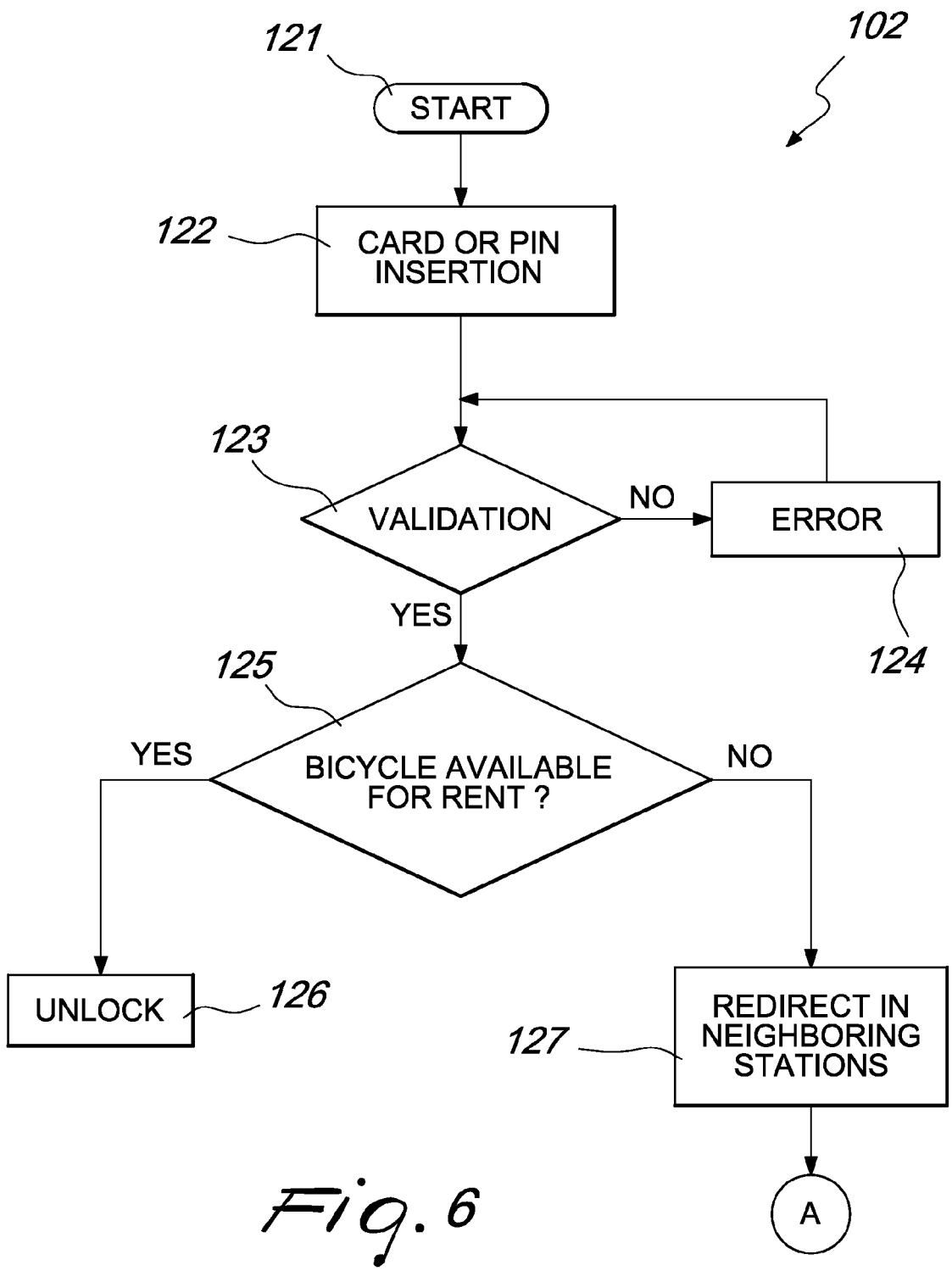
FIG. 6 is a flow diagram of the method of FIG. 5 when a cycle/bicycle is to be rented at the parking station.
Figure 7:
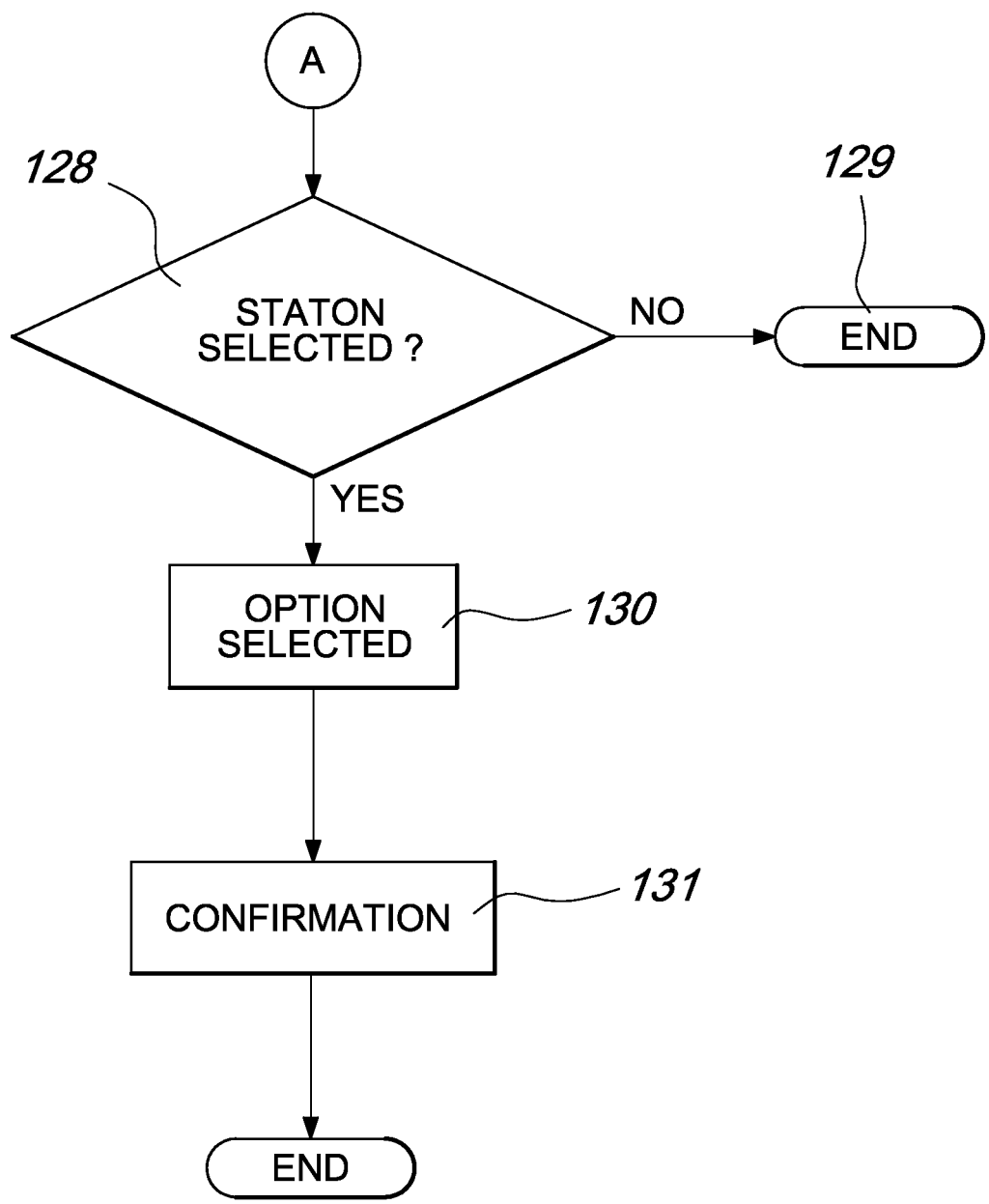
FIG. 7 is a flow diagram of the method of FIG. 5 when a cycle/bicycle to be rented is not available at the automatic parking station.

A procedure similar to that of FIG. 6 is carried out when the user has to return the cycle/bicycle, be it rented or proprietary.

If there is a free parking post 3 in the automatic parking station 1 reached by the user, the user approaches the second lock portion 7 to the first lock portion 4 of the free parking post 3, the microprocessor circuit 42 reads the code stored in the memory medium 8 upon contact and, after having checked that the post has not been booked, moves the electromagnetic lock 41 in the locking position (or changes its polarity, depending on the implementation of the first lock portion) and activates the red LED. A busy status message is accordingly sent by the parking post 3 to the interactive workstations 2 of the automatic parking station 1, which contains the read cycle/bicycle code. Such message may be also forwarded to the central server 31, so as to update the parking database with the current location of the cycle/bicycle.

If the cycle/bicycle was rented, the user can then identify himself at one of the interactive workstations 2 via his credit/debit/smart card or his discount card and, if requested, his PIN. The interactive workstation 2 then sends the central server 31 a message including the user identification and the cycle/bicycle code and, based on the date and time of the day when the cycle/bicycle was picked up and the credit/debit card data or other billing data available at the users database, the user is charged accordingly.

If the cycle/bicycle is user's own property, the user may simply identify himself to the interactive workstation 2, e.g. via his PIN, which was given to the user together with the second lock portion 7. The interactive workstation will check the PIN via the central server 31 and, if the checking is successful, the user database's entry will be updated with the new cycle/bicycle location, represented by the automatic parking station code and the parking post code, and with the date and time of the day, based on which billing is calculated.

If no free parking post 3 is available, after logging the system via insertion of the user's credit/debit/discount/smart card in the slot 23 of an interactive workstation and/or insertion of the associated PIN in the keypad 22, the interactive workstation 2 queries the central server 31, which checks its parking database and returns to the interactive workstation 2 the location of neighboring automatic parking stations having available parking posts (step 104). The user can book one of them through appropriate selection of an on-screen option, similarly to the procedure of step 127-128 discussed above, and the remotely booked parking post is forcedly kept unlocked for a certain time span until the second lock portion 7 of the cycle/bicycle bearing the specific cycle/bicycle code associated to the user in the central server's user database is connected to the first lock portion 4 of the booked parking post. To this aim, the microprocessor circuit 42 of the booked parking post activates the electromagnetic lock 41 (or reverts the magnetic polarity of the first lock portion in case the first and second lock portions are of the electro-magnetic kind) when the reading means 43 detects the same cycle/bicycle code received from the interactive workstation connected to the booked parking post that ordered the circuit 42 to maintain the unlocked status.

Advantageously, in the embodiment wherein both the first lock portion 4 and the second lock portion 7 are magnetic and can be locked together by changing the magnetic polarity of the former, as described above, a third user who tries to lock his cycle/bicycle to the booked parking post will note that the lock portions repel each other and conclude that the parking post has been booked.

Also the red LED activated at the booked parking post will be helpful to the user for immediately detecting an unavailable post.

In the embodiments where the central server 31 is also connected to the Internet and/or to a phone network, after proper user registration which can be carried out in any known way at a service provider, the central server 31 can receive booking messages directly from users via the Internet or the phone network (e.g. through SMS messages, voice or dial tone interaction messages, etc.). A cycle/bicycle available for rent or a free parking post will be kept booked for a certain time span, i.e. maintained in the locked and unlocked state, respectively. A dialogue with the user may be started depending on the parking stations availability and the communication means used by the user to interact with the central server 31. For instance, the time at which the booking expires may be communicated to the user, after which the parking post or the cycle/bicycle will become available again to any user. The user may be also notified of the automatic parking station location and the parking post number via the same means from which the booking request arrived to the central server 31.

It has been noted that the invention described above fully achieves the intended aim and objects.

In particular, the invention facilitates the automatic parking of private cycles and bicycles owned by individual persons, at parking stations located at multiple sites within a city or any limited geographical area and connected via a centralized information system. The invention particularly allows the access to privately-owned cycles and bicycles by eliminating their awkward parking in basements or high-rise apartment buildings and permitting the use of any automatic parking station.

The invention further allows the rental of cycles and bicycles owned by diverse companies and institutions, which can be picked up or dropped off at any automatic parking station located at multiple sites within the city or any limited geographical area and which are connected via a centralized information system.

The invention also facilitates the free competition over rental fees and comfort conditions between diverse companies and institutions that offer cycles and bicycles for rent. Each user will be able to select the cycle or bicycle owned by the company or institution that most suits his or her comfort level and budget needs. For example, a user may select a cycle or bicycle based on the differing rental fees choosing the one with the lowest calculated price, according to the period of rental. Another user however, may base his or her selection on want of comfort and ease of use, and can therefore, choose an electric, gasoline-powered or electrically assisted cycle or bicycle accordingly.

Via the centralized information system it is also possible to provide the renting companies with information about the current location of cycle/bicycles and their usage, in anonymous form, for billing or other strategic purposes.

The invention further facilitates the use of automatic parking stations located at multiple sites within the city which are connected via a centralized information system, with a pre-paid discount card. Pre-purchased discount cards provide free and unlimited access during a predetermined period to diverse facilities (such as museums, private clubs, fitness centers, theaters, cinemas, etc) and services (such as buses, taxis and the use of automatic parking stations) in the city.

These discount cards fundamentally serve to promote policies (facilitating the access to cultural services and promoting the use of the cycle or bicycle system) and business strategies (rewards for frequent users, prices and special fees to access places of work). These discount cards can also be used to facilitate the access of tourists to diverse facilities and services. This last point can surely act as leverage in tourist promotion.

The system thus conceived is susceptible of numerous modifications and variations, all of which are within the scope of the inventive concept as expressed in the appended claims.

Additional revisions and modification to the disclosed invention will occur to the skilled artisan. Such changes and revisions fall within the spirit and scope of applicant's automatic parking station system. Hence, the appended claims should be broadly construed in a manner consistent with the breadth of applicant's invention, and should not be limited to their literal terms.

What is claimed is:

1. An automatic parking station system comprising:
   a station communication network;
   a plurality of parking stations which are client nodes of the station communication network, each parking station located in different sites in a city or a geographical area and associated with a respective parking station code used for addressing the station communication network, each parking station comprising at least one interactive work station, configured to exchange messages with the central server via the station communication network, and a plurality of parking posts;
   a central server connected to the plurality of parking stations via the station communication network; and
   a database in communication with the central server, the database comprising:
      a user database comprising user identification data, billing information and said cycle or bicycle codes, and
      a parking database comprising the parking station codes associated with each parking station and, for each parking station code, a geographical location of the corresponding parking station and the number of parking posts of the corresponding parking station which have a locked cycle or bicycle available for rent or the number of posts having no cycles or bicycles locked thereto;
   wherein the messages from the parking stations comprise at least one of:
      a) status messages comprising information about the busy or free parking status of the parking station from which the status message is sent,
      b) charging or billing messages which request or acknowledge payment by a user,
      c) operation messages which communicate requests for servicing or maintenance, or
      d) requests and corresponding responses for available free parking posts at neighboring parking stations located in a proximity of the parking station from which the requests are sent, based on locked or unlocked status information of each of the parking posts of the neighboring parking stations; and
   wherein the central server is configured to receive the messages from the parking stations, to update the database according to the intent of said messages, and to update the number of parking posts based on the busy or free parking status information contained in the status messages received from the parking stations.

2. The system according to claim 1, wherein each status message comprises the parking station code, a parking post code for univocally identifying the parking post of the parking station from which the status message was triggered, and the locked or unlocked status information of the parking post.

3. The system of claim 1 wherein each billing message comprises the date and time at which the locked or unlocked status of the parking post triggering the generation of the billing message changed.

4. The system of claim 1, wherein the central server is configured to allow renting companies to access said database and to conceal the private data of said users from said companies.

5. The system of claim 1, wherein the central server is connected to the Internet or to a phone network, in order to be remotely accessible for renting or parking requests from any user of the system.

* * * * *